United States Patent
Fu

(10) Patent No.: US 8,824,428 B2
(45) Date of Patent: Sep. 2, 2014

(54) METHOD FOR RESOLVING DATA CONFLICTS AND MOBILE TERMINAL

(75) Inventor: Jie Fu, Shanghai (CN)

(73) Assignee: Spreadtrum Communications (Shanghai) Co., Ltd., Shanghai (CN)

( * ) Notice: Subject to any disclaimer, the term of this patent is extended or adjusted under 35 U.S.C. 154(b) by 527 days.

(21) Appl. No.: 13/104,767

(22) Filed: May 10, 2011

(65) Prior Publication Data

US 2012/0100862 A1 Apr. 26, 2012

(30) Foreign Application Priority Data

Oct. 21, 2010 (CN) .......................... 2010 1 0518651

(51) Int. Cl.
| | |
|---|---|
| *H04J 3/00* | (2006.01) |
| *H04B 7/212* | (2006.01) |
| *H04W 72/12* | (2009.01) |
| *H04W 88/02* | (2009.01) |
| *H04W 72/04* | (2009.01) |

(52) U.S. Cl.
CPC .......... *H04W 72/1242* (2013.01); *H04W 88/02* (2013.01); *H04W 72/0446* (2013.01)
USPC .......................................... 370/337; 370/347

(58) Field of Classification Search
USPC ................................ 370/337, 347
See application file for complete search history.

(56) References Cited

U.S. PATENT DOCUMENTS

2007/0253364 A1* 11/2007 Wandel .......................... 370/329
2012/0082143 A1* 4/2012 Harnay et al. ................. 370/337

FOREIGN PATENT DOCUMENTS

| CN | 101237683 A | 8/2008 |
|---|---|---|
| CN | 101969671 A | 2/2011 |

* cited by examiner

*Primary Examiner* — Noel Beharry
*Assistant Examiner* — Kodzovi Acolatse
(74) *Attorney, Agent, or Firm* — Kilpatrick Townsend & Stockton LLP

(57) ABSTRACT

The invention provides a method for resolving data conflicts and a mobile communication terminal. The embodiment about the method of the invention includes: a mobile terminal determining a time slot in a frame i for receiving a first data block; if a second data block needs to be received in the frame i, the mobile terminal determining a relationship between the time slot for receiving the first data block and a time slot for receiving the second data block; and if the time slots for receiving the first data block and the second data block are not the same and not adjacent, the mobile terminal receiving the first data block and the second data block sequentially according to the time slots in the frame i. The embodiment of the invention further provides a mobile terminal for implementing the method described above. The invention could receive multiple data blocks in a frame i and decrease the number of data blocks being discarded.

4 Claims, 4 Drawing Sheets

METHOD FOR RESOLVING DATA CONFLICTS AND MOBILE TERMINAL

CROSS REFERENCE TO RELATED APPLICATIONS

The present application claims the priority of Chinese Patent Application No. 201010518651.1, entitled "Method for resolving data conflicts and mobile terminal", and filed Oct. 21, 2010, the entire disclosure of which is incorporated herein by reference.

FIELD OF THE INVENTION

The present invention relates to mobile communication technology, and particularly relates to a method for resolving data conflicts and a mobile communication terminal.

DESCRIPTION OF PRIOR ART

With the rapid development of mobile communication technology, mobile communication products have become more and more popular and play an important role in people's daily life. Nowadays, the Global System for Mobile Communications (GSM) is used most widely.

The interleaving technology is used in GSM to guarantee the signal quality: firstly, a data block comprising 465 bits is interleaved interiorly and divided into eight groups, then the first four groups are interleaved with the second four groups and four full bursts are acquired therefrom, wherein the four full bursts are called four frames and form a data block; the data block is transmitted to a mobile terminal. The mobile terminal receives data blocks from broadcast channels and paging channels. The data blocks from the broadcast channels carry the system information of a cell, which comprises access parameters of the cell and information about the operator, and so on. A handset needs to acquire the whole data blocks from the broadcast channels to reside in the cell. The mobile terminal acquires network paging messages through receiving data blocks from the paging channels. If the paging messages are discarded, the handset will miss some calls.

However, some technical limitations still exist in the process of receiving data blocks of a mobile terminal. Because most mobile terminals based on GSM just have one radiofrequency (RF) transceiver module, the mobile terminals can but receive the data block from one cell at a time. If data blocks from different cells arrive at the mobile terminal at the same time, the mobile terminal has to choose to receive the data block from the cell having the highest priority and discard the data blocks from other cells which arrive at the mobile terminal at the same time. After the data block from the cell having the highest priority is received, the mobile terminal continues to receive the next data block. In this case, because only a data block could be received in one frame, other data blocks which need to be received in the same frame are discarded, which reduces the phone connection rate and results in missing calls for a handset, further, leads to system information not be updated in time and slow cell switching.

SUMMARY OF THE INVENTION

The embodiments of the invention provide a method for resolving data conflicts and a mobile terminal for increasing the phone connection rate and improving the cell switching rate.

According to one embodiment of the invention, a method for resolving data conflicts comprises: a mobile terminal determining a time slot of a frame i for receiving a first data block; if a second data block needs to be received in the frame i, the mobile terminal determining a relationship between the time slot for receiving the first data block and a time slot for receiving the second data block; and if the time slots for receiving the first data block and the second data block are not the same and not adjacent, the mobile terminal receiving the first data block and the second data block sequentially according to the time slots of the frame i.

According to one embodiment of the invention, a mobile terminal comprises: an acquiring unit, for determining time slots in a frame i for receiving data blocks; a determining unit, for determining a relationship of the time slots for receiving the data blocks; and a receiving unit, for receiving the data blocks sequentially according to the time slots of the frame i.

Compared with the prior art, the invention has the following advantages: the mobile terminal chooses the data blocks to be received in the time slots which are not the same and not adjacent to receive, according to the relationship of the time slots for receiving data blocks, thereby a plurality of data blocks being received in the frame i, decreasing the number of data blocks being discarded, increasing the phone connection rate and improving the cell switching rate.

DETAILED DESCRIPTION OF THE EMBODIMENTS

The embodiments of the present invention provide a method for resolving data conflicts and a mobile terminal.

Figure 1:
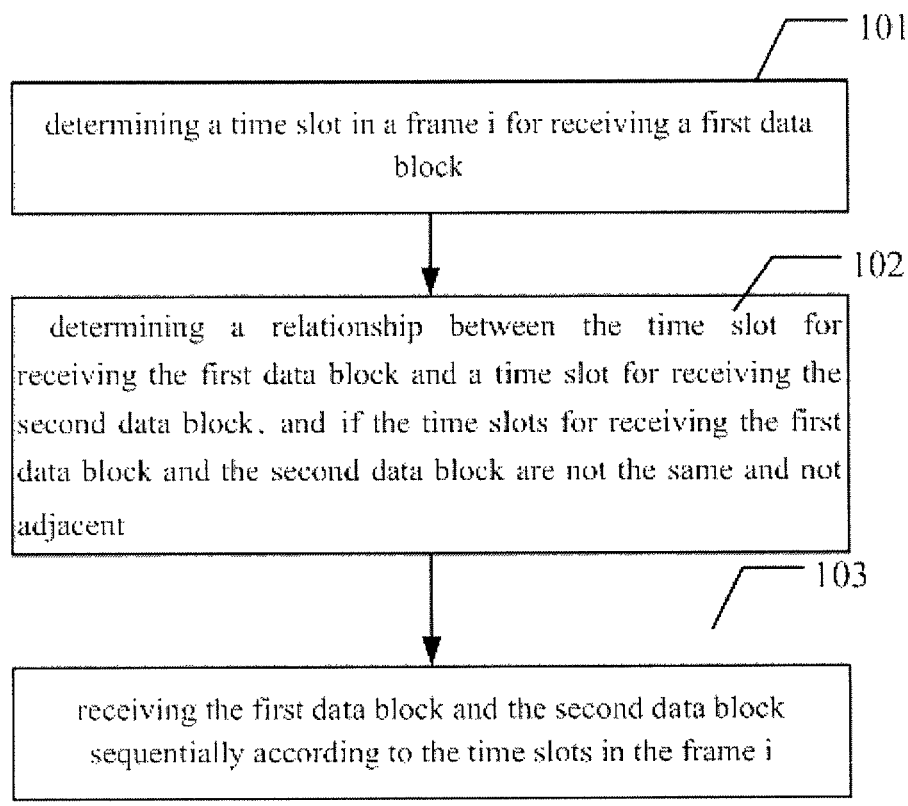
FIG. 1 shows a schematic diagram of a method for resolving data conflicts in the first embodiment.

FIG. 1 shows a schematic diagram of a method for resolving data conflicts in the first embodiment, comprising:

Step 101, determining a time slot in a frame i for receiving a first data block.

Specifically, a mobile terminal receives system messages from a broadcast channel and network paging messages from a paging channel. The system messages and network paging messages are data blocks including four frames. The first data block is received in a time slot of a frame i, wherein the frame i is any frame of the mobile terminal for receiving data blocks. The length of the frames of the mobile terminal for receiving data blocks is 4.615 ms. Each frame comprises 8 time slots which are marked as 0, 1, 2, 3, 4, 5, 6 and 7. In practice, only one time slot of the frame i is used for receiving one data block. Which time slot of the frame i for receiving data blocks from the paging channel can be determined by the network parameters and the International Mobile Subscriber Identity (IMSI). Data blocks from the broadcast channels are always received in the time slot 0 of the frame i.

Step 102, determining the relationship between the time slot for receiving the first data block and the time slot for receiving a second data block, if the time slots are not the same and not adjacent, performing a step 103.

Specifically, if the second data block needs to be received in the frame i, the mobile terminal determines the relationship between the time slot for receiving the first data block and the time slot for receiving the second data block and chooses the data block to be received according to the relationship of the time slots.

Step 103, receiving data blocks sequentially according to the time slots in the frame i.

Specifically, if the time slots for receiving the first and the second data blocks are not the same and not adjacent, the mobile terminal receives the first and the second data blocks in different time slots which are not adjacent in the frame i.

Figure 2:
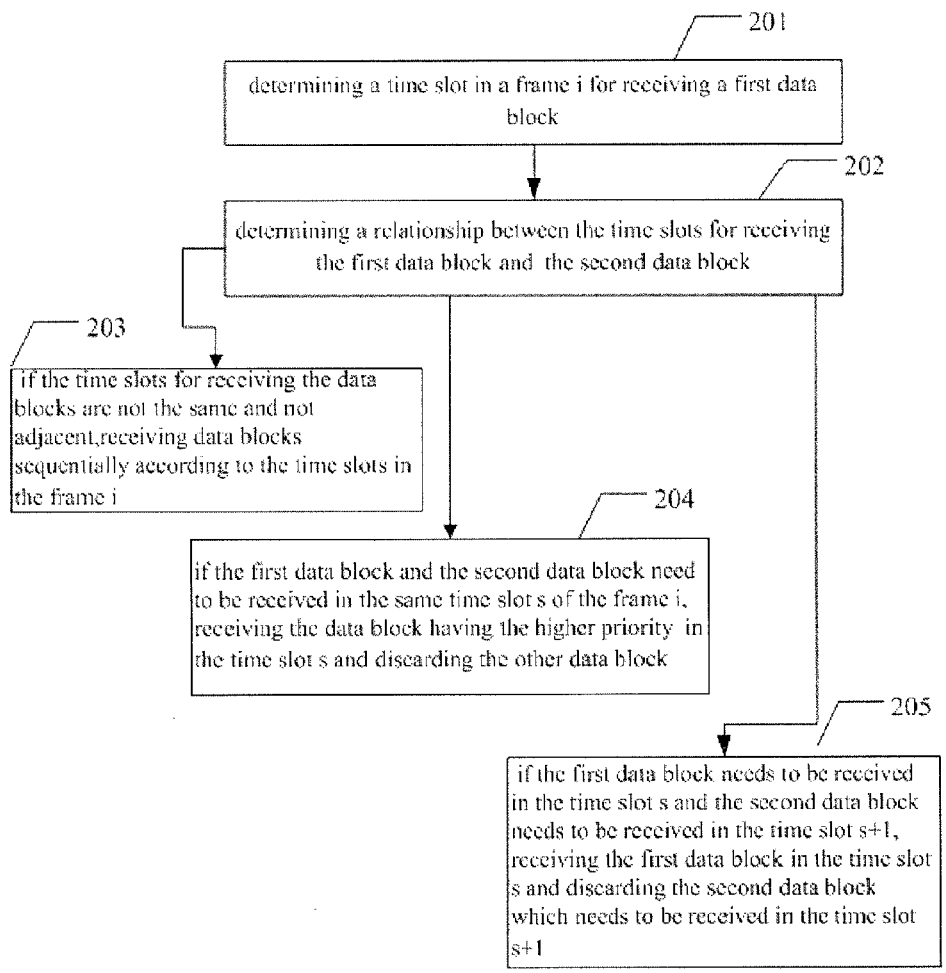
FIG. 2 shows a schematic diagram of a method for resolving data conflicts in the second embodiment.

Hereinafter, the method for resolving data conflicts is described in detail. FIG. 2 shows a schematic diagram of a method for resolving data conflicts in the second embodiment, comprising:

Step 201, determining a time slot in a frame i for receiving a first data block.

Step 202, determining the relationship between the time slot for receiving the first data block and the time slot for receiving a second data block. Specifically, if the time slots are not the same and not adjacent, a step 203 is performed; if the time slots are the same such as the time slot s for receiving the first and the second data block, a step 204 is performed; if the first data block needs to be received in the time slot s and the second data block needs to be received in the time slot s+1, a step 205 is performed. The mobile terminal chooses the data block to be received according to the relationship between the time slots for receiving data blocks.

Step 203, receiving data blocks sequentially according to the time slots in the frame i.

Specifically, the frame i comprises 8 time slots which are marked as 0, 1, 2, 3, 4, 5, 6 and 7. Because the time slots for receiving data blocks are not the same and not adjacent, four data blocks can be received in the frame i at most.

Step 204, receiving the data block having the highest priority in the time slot and discarding other data blocks.

Specifically, if the first data block and the second data block need to be received in the same time slot s of the frame i, the data block having the highest priority is received in the time slot s and other data blocks are discarded, wherein the time slot s is any time slot of the frame i.

The priority of the data blocks are determined according to the current state of the mobile terminal: in the process of cell switching, the data block from the broadcast channel having the highest priority; in other cases, the data block from the paging channel having the highest priority.

Step 205, receiving the first data block in the time slot s and discarding the second data block which needs to be received in the time slot s+1.

Specifically, if the first data block needs to be received in the time slot s and the second data block needs to be received in the time slot s+1, the mobile terminal receives the first data block in the time slot s and discards the second data block which needs to be received in the time slot s+1. The time slot s and the time slot s+1 are any time slot of the frame i.

It should be noted that the first data block and the second data block are just names of different data blocks, which have no affection on the reception of data blocks.

Figure 3:
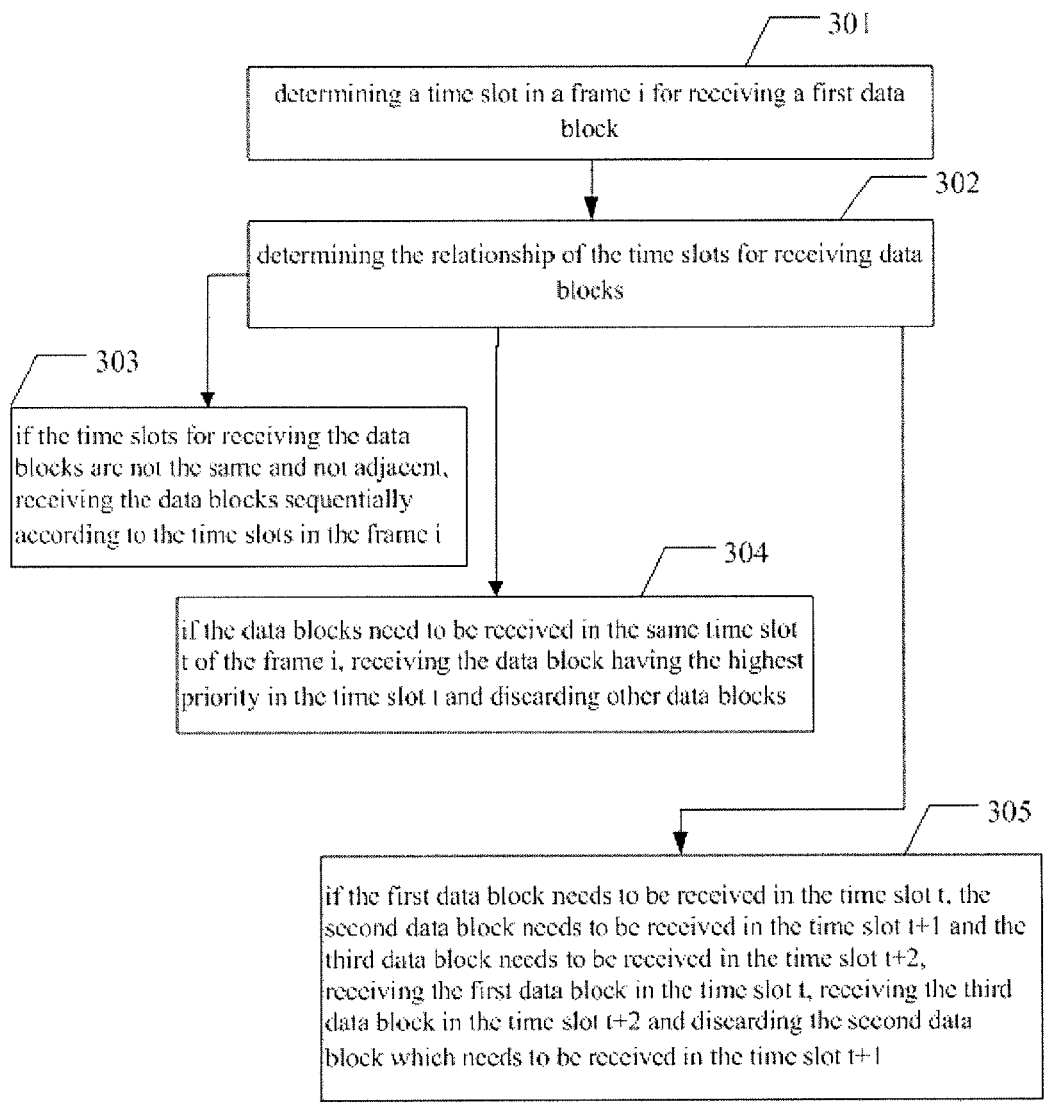
FIG. 3 shows a schematic diagram of a method for resolving data conflicts in the third embodiment.

Hereafter, a method for resolving data conflicts when a first data block, a second data block and a third data block all need to be received in a frame i. Referring to FIG. 3, a schematic diagram of a method for resolving data conflicts in the third embodiment is shown, comprising:

Step 301, determining a time slot in a frame i for receiving a first data block.

Step 302, determining the relationship of the time slots for receiving data blocks. Specifically, if the time slots are not the same and not adjacent, a step 303 is performed; if the time slots are the same such as the time slot t for receiving the first, the second data block and the third data block, a step 304 is performed; if the first data block needs to be received in the time slot t, the second data block needs to be received in the time slot t+1 and the third data block needs to be received in the time slot t+2, a step 305 is performed.

When the second data block and the third data block need to be received in the frame i, the mobile terminal chooses the data block to be received according to the relationship of the time slots for receiving these data blocks.

Step 303, receiving data blocks sequentially according to the time slots in the frame i.

Specifically, if the time slots for receiving the first data block, the second data block and the third data the are not the same and not adjacent, the mobile terminal receives the data blocks sequentially according to the time slots in the frame i.

Step 304, receiving the data block having the highest priority in the time slot t and discarding other data blocks.

Specifically, if the first data block, the second data block and the third data block need to be received in the same time slot t of the frame i, the data block having the highest priority is received in the time slot t and other data blocks are discarded, wherein the time slot t is any time slot of the eight time slots of the frame i.

Step 305, receiving the first data block in the time slot t, receiving the third data block in the time slot t+2 and discarding the second data block which needs to be received in the time slot t+1.

Specifically, if the first data block needs to be received in the time slot t, the second data block needs to be received in the time slot t+1 and the third data block needs to be received in the time slot the mobile terminal receives the first data block in the time slot t, receives the third data block in the time slot t+2 and discards the second data block which needs to be received in the time slot t+1.

The time slots for receiving data blocks of the present invention should follow the principle that the time slots are not the same and not adjacent. According to the third embodiment, the time slot t+1 for receiving the second data block are adjacent to the time slot for receiving the first data block and the third data block, therefore, the second data block is discarded.

It should be noted that, according to the embodiments of the present invention, the first data block and the second data block which conflict in the frame i, or the first data block, the second data block and the third data block which conflict in the frame i, both are examples for illustrating the method for resolving data conflicts, which does not limit the number of data blocks received in the frame i. In practice, there can be any number of data blocks received in the frame i.

According to the embodiments, the methods for resolving data conflicts choose the data blocks, which need to be received in the time slots which are not the same and not adjacent, to receive, through determining the relationship of the time slots for receiving data blocks, thereby a plurality of data blocks being received in the frame i, decreasing the number of data blocks which are discarded, increasing the phone connection rate and improving the cell switching rate.

In order to illustrate the present invention more clearly, an application of resolving data conflicts is described hereafter.

Three data blocks need to be received in one frame (for example, the $21^{st}$ frame) of a mobile terminal, which are data block A from a broadcast channel, data block B and data block C from a paging channel. It should be noted that the data blocks arrived at the mobile terminal could be from other types of channels. Here the data blocks from the broadcast channel and the paging channel are taken as an example. In practice, the type of the data block received by a mobile terminal is not limited.

The data block A, the data block B and the data block C all need to be received in the $21^{st}$ frame of the mobile terminal, then a data receiving conflict occurs. According to the embodiment for resolving the data conflict of the present invention, the mobile terminal determines the time slots for receiving the data block A, the data block B and the data block C, wherein the time slots of the $21^{st}$ frame for receiving the data blocks from the paging channels are calculated according to the network parameters and the IMSI of the mobile terminal and data blocks from the broadcast channels are always received in the time slot 0 of the $21^{st}$ frame. It should be noted that under some special circumstance, the time slot for receiving data blocks may be the time slot 0, the time slot 2, the time slot 4 or the time slot 6. However, the embodiment of the present invention is described in the general case.

If the data block A from a broadcast channel needs to be received in the time slot 0 of the $21^{st}$ frame, the data block B needs to be received in the time slot 2 and the data block C needs to be received in the time slot 4, the relationship of the time slots for receiving the data blocks is determined. The time slots for receiving the data block A, the data block B and the data block C are not the same and not adjacent, therefore, the data block A is received in the time slot 0 of the $21^{st}$ frame, the data block B is received in the time slot 2 and the data block C is received in the time slot 4.

If the data block A needs to be received in the time slot 0 of the $21^{st}$ frame, the data block B and the data block C also need to be received in the time slot 0, the mobile terminal finds that the three data blocks all need to be received in the same time slot 0 through determining the relationship of the time slots. Then, the mobile terminal determines the priority of the data blocks, receives the data block having the highest priority in the time slot 0 of the $21^{st}$ frame and discards other data blocks. If the data block A has the highest priority, the data block A is received in the time slot 0 of the $21^{st}$ frame and the data block B and the data block C are discarded.

If the data block A needs to be received in the time slot 0 of the $21^{st}$ frame, the data block B needs to be received in the time slot 1 and the data block C needs to be received in the time slot 2, the mobile terminal finds that the three data blocks need to be received in adjacent time slots through determining the relationship of the time slots. Then, the mobile terminal receives the data block A in the time slot 0 of the $21^{st}$ frame, discards the data block B for making sure that the data block A is received completely, and receives the data block C in the time slot 2.

If a data block D and a data block E need to be received in one frame (for example, the $22^{nd}$ frame) of a mobile terminal and a data receiving conflict occurs, the mobile terminal determines the time slots for receiving the data block D and the data block E, in order to resolve the conflict.

If the data block D needs to be received in the time slot 3 of the $22^{nd}$ frame and the data block E needs to be received in the time slot 5, in other words, the time slots for receiving the data block D and the data block E are not the same and not adjacent, the mobile terminal receives the data block D in the time slot 3 of the $22^{nd}$ frame and receives the data block E in the time slot 5 of the 22" frame.

If the data block D and the data block E both need to be received in the time slot 3 of the $22^{nd}$ frame, the mobile terminal determines the priority of the data blocks and receives the data block having the higher priority. Specifically, if the priority of the data block E is higher than the priority of the data block D, the mobile terminal receives the data block E in the time slot 3 of the $22^{nd}$ frame.

If the data block D needs to be received in the time slot 3 of the 22" frame and the data block E needs to be received in the time slot 4, the mobile terminal receives the data block D in the time slot 3 of the 22" frame and discards the data block E in the time slot 4.

According to the embodiments, the mobile terminal determines the relationship of the time slots for receiving data blocks in the same frame and choose the data blocks which need to be received in the time slots which are not the same and not adjacent, thereby a plurality of data blocks being received in one frame, decreasing the number of data blocks being discarded, increasing the phone connection rate and improving the cell switching rate.

Figure 4:
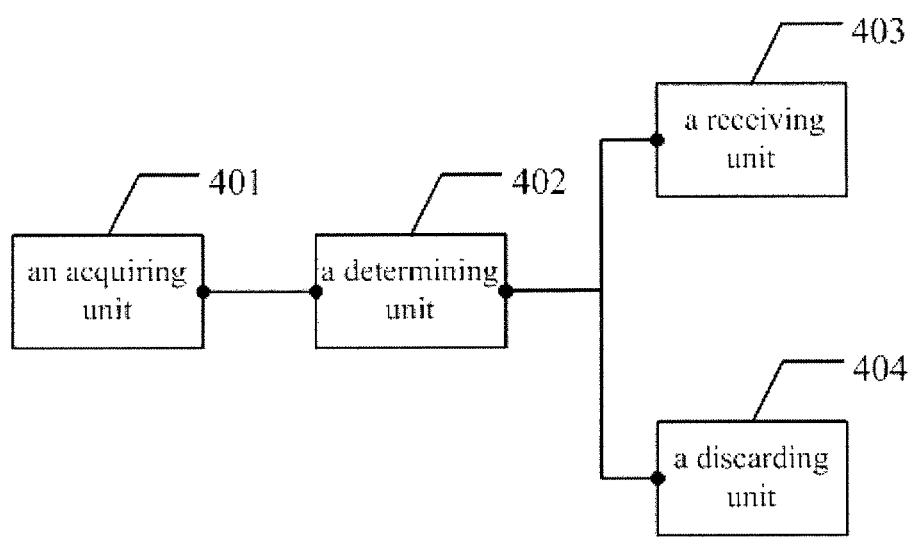
FIG. 4 shows a schematic diagram of a mobile terminal in the first embodiment.

FIG. 4 shows a schematic diagram of a mobile terminal in the first embodiment, comprising:

An acquiring unit 401, for determining time slots in a frame i for receiving data blocks;

A determining unit 402, for determining the relationship of the time slots for receiving the data blocks; and A receiving unit 403, for receiving data blocks sequentially according to the time slots of the frame i.

The embodiment further comprises a discarding unit 404 for discarding data blocks having lower priority when a plurality of data blocks need to be received in the same time slot s of the frame i. If a first data block needs to be received in the time slot s of the frame i and a second data block needs to be received in the time slot s+1 of the frame i, the second data block which needs to be received in the time slot s+1 is discarded; if a first data block needs to be received in the time slot t of the frame i, a second data block needs to be received in the time slot t+1 and a third data block needs to be received in the time slot t+2, the second data block which needs to be received in the time slot t+1 is discarded.

According to the embodiment of the present invention, when a plurality of data blocks need to be received in the frame i, the acquiring unit 401 determines the time slots of the frame i in which the data blocks are received, the determining unit 402 determines the relationship of the time slots for receiving the data blocks, then the receiving unit 403 receives data blocks which need to be received in the time slots which are not the same and not adjacent according to the relationship, and the discarding unit 404 discards the data blocks which could not be received.

According to the embodiments of the present invention, when conflicts occur between a plurality of data blocks which need to be received in one frame, the mobile terminal determines the relationship of the time slots for receiving data blocks in the same frame and choose the data blocks which need to be received in the time slots which are not the same and not adjacent, thereby a plurality of data blocks being received in one frame, decreasing the number of data blocks being discarded, increasing the phone connection rate and improving the cell switching rate.

Those skilled in the art can understand that the steps of the embodiments about the methods for resolving receiving data conflicts may be implemented by a program instructing some related hardware, wherein the program is stored in a computer readable storage medium, such as a read only memory, a disk or a CD-ROM, and so on.

Although the present invention has been disclosed as above with reference to preferred embodiments thereof but will not be limited thereto. Those skilled in the art can modify and vary the embodiments without departing from the spirit and scope of the present invention. Accordingly, the scope of the present invention shall be defined in the appended claims.

What is claimed is:

1. A method for resolving data conflicts, comprising:
   a mobile terminal determining a time slot of a frame i for receiving a first data block;
   if a second data block needs to be received in the frame i, the mobile terminal determining a relationship between the time slot for receiving the first data block and a time slot for receiving the second data block;
   if the time slots for receiving the first data block and the second data block are not the same and not adjacent, the mobile terminal receiving the first data block and the second data block sequentially according to the time slots of the frame i;
   if the first data block and the second data block need to be received in a same time slot s of the frame i, the mobile terminal receiving one of the first data block and the second data block which has a higher priority in the time slot s and discarding the other of the first data block and the second data block, wherein the time slot s is any time slot of time slot 0 to time slot 7 of the frame i;
   if the first data block needs to be received in the time slot s and the second data block needs to be received in a time slot s+1, the mobile terminal receiving the first data block in the time slot s and discarding the second data block which needs to be received in the time slot s+1; and
   if the first data block needs to be received in the time slot t, the second data block needs to be received in the time slot t+1 and a third data block needs to be received in the time slot t+2, the mobile terminal receiving the first data block in the time slot t, receiving the third data block in the time slot t+2 and discarding the second data block which needs to be received in the time slot t+1.

2. The method of resolving data conflicts of the claim 1, wherein after the mobile terminal determines the time slot in the frame i for receiving the first data block, if a second data block and a third data block both need to be received in the frame i, the mobile terminal determines a relationship of time slots for receiving the first data block, the second data block and the third data block; and
   if the time slots for receiving the first data block, the second data block and the third data block are not the same and not adjacent, the mobile terminal receives the first data block, the second data block and the third data block sequentially according to the time slots of the frame.

3. The method of resolving data conflicts of the claim 2, further comprising:
   if the first data block, the second data block and the third data block need to be received in a same time slot t of the frame i, one of the first data block, the second data block and the third data block which has the highest priority being received in the time slot t and other data blocks of the first data block, the second data block and the third data block being discarded, wherein the time slot t being any time slot of time slot 0 to time slot 7 of the frame i.

4. A mobile terminal, comprising:
   a computer processor; and
   a memory device in communication with the computer processor having sets of instruction stored thereon which, when executed by the computer processor, cause the computer processor to implement:
   an acquiring unit, for determining time slots in a frame i for receiving data blocks;
   a determining unit, for determining a relationship of the time slots for receiving the data blocks;
   a receiving unit, for receiving the data blocks sequentially according to the time slots of the frame i; and
   a discarding unit, wherein if a first data block and a second data block need to be received in a same time slot s of the frame i, the discarding unit discards data blocks not having the highest priority, wherein the time slot s is any time slot of time slot 0 to time slot 7 of the frame i; if a first data block needs to be received in the time slot s of the frame i and a second data block needs to be received in the time slot s+1 of the frame i, the discarding unit discards the second data block which needs to be received in the time slot s+1; and if a first data block needs to be received in the time slot t of the frame i, a second data block needs to be received in the time slot t+1 and a third data block needs to be received in the time slot t+2, the discarding unit discards the second data block which needs to be received in the time slot t+1.

* * * * *